United States Patent Office 3,000,998
Patented Sept. 19, 1961

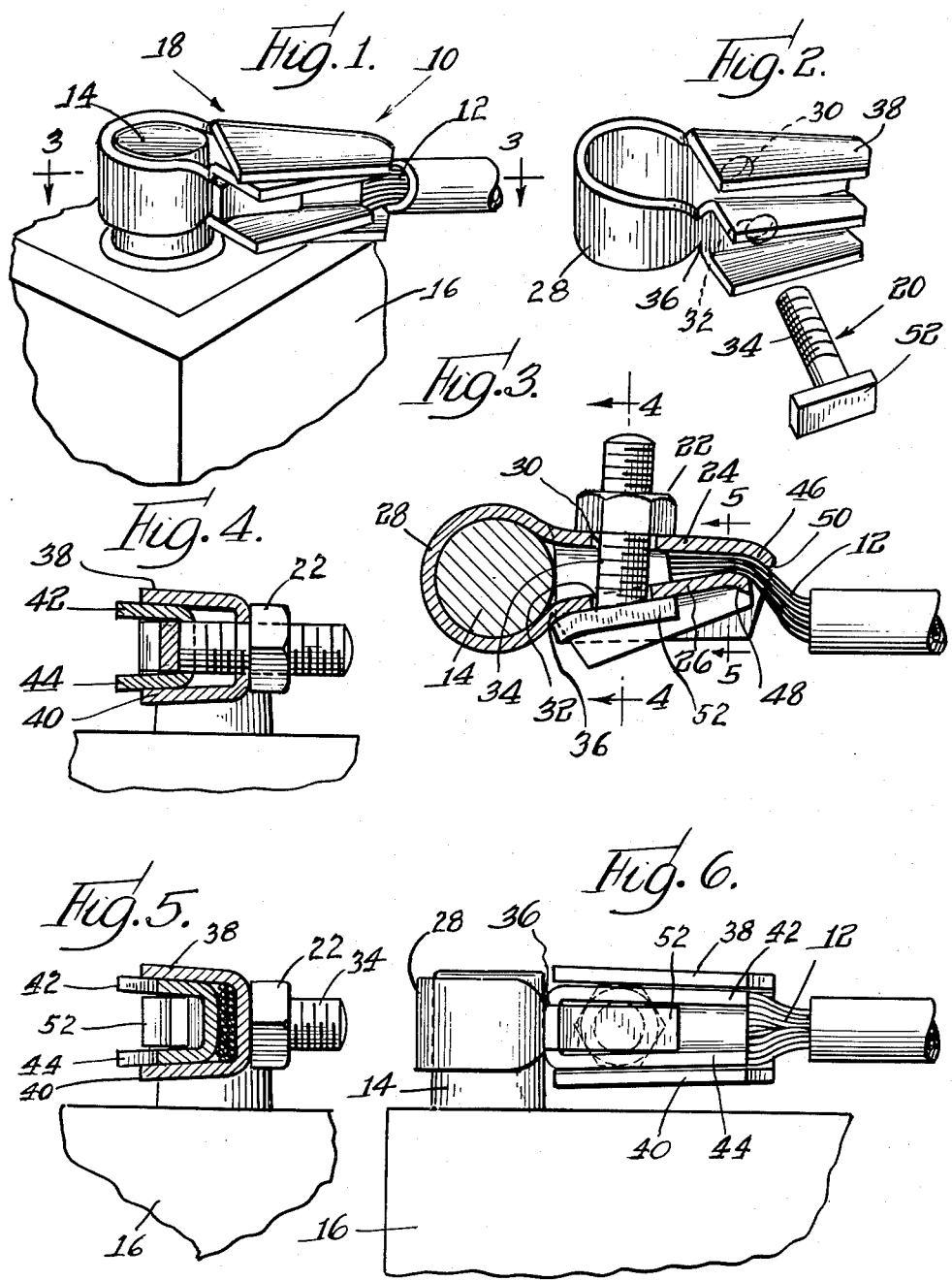

3,000,998
BATTERY TERMINAL CLAMP
Joseph A. Wiora, Almond, Wis., assignor to Wiora Products Corporation, Almond, Wis., a corporation of Wisconsin
Filed Apr. 16, 1959, Ser. No. 806,941
2 Claims. (Cl. 136—135)

The present invention relates to a novel terminal clamp, and more particularly to a novel clamp or connector especially suitable for use with a battery terminal or the like.

It is an important object of the present invention to provide a novel terminal clamp which is constructed so as to obtain an improved mechanical and electrical connection with electrical wires or cables.

Another important object of the present invention is to provide a novel clamp or connector which is constructed so that it is especially adapted for application to battery terminals and the like of various sizes or diameters.

A further object of the present invention is to provide a novel battery terminal clamp of the above described type which is of simple, economical and rugged construction.

A more specific object of the present invention is to provide a novel battery terminal clamp of the above described type which is constructed so as to obtain an improved mechanical and electrical connection with electrical wires or cables of different diameters.

Other objects and advantages of the present invention will become apparent from the following description and the accompanying drawings wherein:

FIG. 1 is a fragmentary perspective view showing an electrical wire or cable connected with a battery terminal by means of a terminal clamp constructed in accordance with features of the present invention;

FIG. 2 is an exploded perspective view showing elements of the novel battery terminal clamp shown in FIG. 1;

FIG. 3 is a partial sectional view taken along line 3—3 in FIG. 1;

FIG. 4 is a partial sectional view taken along line 4—4 in FIG. 3;

FIG. 5 is a sectional view taken along line 5—5 in FIG. 3; and

FIG. 6 is a fragmentary side elevational view of the structure shown in FIG. 1.

Referring now more specifically to the drawing wherein like parts are designated by the same numerals throughout the various figures, a battery terminal clamp 10 is shown for the purpose of illustrating the present invention, which clamp is adapted electrically and mechanically to connect a wire or cable 12 with a terminal 14 of a battery 16. It will be understood, of course, that the clamp may be used for connecting wires or cables with terminals of other structures. In general, the clamp structure 10 comprises a member 18 which may be economically formed from suitable sheet metal, and a complementary bolt 20 and nut 22 for tightening the clamping member 18 on the wire or cable 12 and the terminal 14 in the manner described in detail below.

The one-piece sheet metal clamping member 18 is provided with opposing generally straight clamping sections 24 and 26, which are initially, as indicated in FIG. 2, are disposed in substantially parallel relationship. An intermediate loop section 28 is provided between and integrally joins the clamping sections 24 and 26. As shown in the drawings, the loop section 28 is adapted to encircle the battery terminal 14 and the clamping sections 24 and 26 are adapted to grip and retain an end portion of the cable 12. The clamping sections 24 and 26 are, respectively, provided with generally aligned apertures 30 and 32 at locations between their ends for receiving a threaded shank 34 of the bolt 20 so that when the nut 22 is threaded onto the bolt the clamping member 18 may be tightened on the battery terminal 14 and the cable 12.

It will be appreciated that batteries are frequently provided with terminals of different diameters. In order to enable the clamping member 18 to be applied to the larger battery terminals usually encountered as well as smaller terminals, the loop section 28 is initially provided with a generally U-shaped configuration as indicated in FIG. 2. Furthermore, it is important to note that the looped section 28 initially extends laterally outwardly from the clamping section 24 while the section 26 initially provides a substantially straight continuation of the loop section, and also that the junction 36 between the loop section 28 and the clamping section 26 is of substantially reduced width as compared with the remainder of the loop section. Thus, when the clamping sections 24 and 26 are drawn together by the nut and bolt means, the clamping member 18 will bend along the junction line 36 relatively easily so as to enable the loop section 28 to be formed around and aggressively tightened against the terminal 14 regardless of the diameter of the terminal, within, of course, reasonable limits. Thus, it is seen that the full length of the loop section 28 is utilized for obtaining a mechanical and electrical connection with the terminal 14.

As shown in the drawings, flanges 38 and 40 are formed integrally with opposite longitudinally extending margins of the clamping section 24 and extend laterally for overlapping and embracing the clamping section 26. As indicated in FIG. 2, the lateral extent of the flanges 38 and 40 is preferably substantially equal to the initial or normal spacing of the clamping sections 24 and 26. Thus, the clamping sections 24 and 26 and the flanges 38 and 40 combined together to provide an adjustable tubular closure for accommodating wires or cables of different sizes or diameters. The flanges 38 and 40 also serve to strengthen and rigidify the section 24, and in this connection additional flanges 42 and 44 are formed integrally with longitudinally extending margins of the clamping section 26 and extend laterally therefrom in the manner shown.

It is to be noted that outer end portions 46 and 48 of the clamping sections 24 and 26 are formed so that they extend in generally parallel relationship and diagonally with respect to the remainder of the clamping sections as shown best in FIG. 3. As a result, the cable 12 will be bent into a zig-zag shape as shown in FIG. 3 when the clamping sections are tightened. Thus, a positive mechanical as well as frictional connection is obtained between the clamping sections and the cable. Furthermore, the bending or flexing of the cable promotes spreading and flattening of the cable, as shown in FIGS. 3, 5 and 6, so that the cable extends substantially entirely across the clamping sections regardless of the initial diameter of the cable. As a result, the terminal clamp is adapted to accommodate cables of various diameters and still obtain a maximum area of contact between the clamp and the cable regardless of the diameter of the cable. Spreading of the end portion of the cable in order to facilitate a superior mechanical and electrical connection is further facilitated by constructing the clamping sections 24 and 26 so that they are of progressively increasing width in a direction extending from their free ends toward the intermediate loop section. In order to minimize any possibility of cutting strands of the cable 12, a free terminal edge 50 of the end portion 46 is rounded as shown in FIG. 3, and the end portion 48 may be similarly rounded.

As shown best in FIGS. 2 and 3, the bolt 20 is provided with an elongated relatively thin head 52, and the bolt is preferably made so that the head is relatively easily deformable. The head 52 is formed so that it normally radiates in a plane perpendicular to the axis of the bolt shank 34 and extends to and preferably slightly past the narrow junction 36 between the clamping section 26 and the loop section 28 and also for a substantial distance toward the outer end portion of the clamping section 26. When the clamping member 18 is drawn together by the bolt and nut means, the section 26 is shifted from a position generally parallel to the section 24 to a position more or less inclined with respect to the clamping section 24, depending on the diameter of the battery terminal 14 and the diameter of the cable 12. As a result of the construction of the bolt head described above, the bolt head will automatically be formed during tightening of the nut to accommodate the inclined position of the clamping section 26 so as to exert clamping pressure to the section 26 throughout an area extending at least from the junction 36 to a point extending substantially toward the outer free end of the clamping section. Thus, the clamping forces provided by the nut and bolt are distributed more uniformly over the clamping member 18 to promote improved engagement of the clamping member with the battery terminal and cable.

While the preferred embodiment of the present invention has been shown and described herein, it is obvious that many structural details may be changed without departing from the spirit and scope of the appended claims.

What I claim as new, and desire to secure by United States Letters Patent, is:

1. A battery terminal clamp comprising a one-piece sheet metal member including first and second elongated opposing sections for clamping a wire therebetween and a one-piece bendable loop section between and integrally joined to ends of said clamping sections for encircling a battery terminal or the like, said clamping sections including substantially aligned apertures therethrough at locations between said loop section and outer end portions of said clamping sections, a bolt including a head overlying one of said clamping sections and a threaded shank extending through said apertures, and a nut threaded onto an outer end of said shank for drawing said clamping sections together, said outer end portions of said clamping sections extending diagonally from the remainder of said clamping sections for imparting a bend to a wire secured between said clamping sections, said bolt head being relatively thin and deformable for conforming to said one clamping section when the nut is tightened for distributing clamping forces more uniformly over said one clamping section.

2. A battery terminal clamp comprising a one-piece sheet metal member including first and second elongated sections initially disposed in spaced apart generally parallel and opposing relationship for clamping a wire therebetween, a one-piece bendable loop section integrally joined with one end of said first clamping section and initially extending laterally outwardly therefrom away from said second section and then being looped back and integrally joined to said second section, said loop section having a predetermined width, the junction between said loop section and said second clamping section being of substantially reduced width for facilitating forming of the loop section around battery terminals or the like of different diameters, said clamping sections including substantially aligned apertures therethrough at locations between said loop section and outer end portions of said clamping sections, a bolt including a deformable head portion overlying said second clamping section for conforming to changes in position of the second section during tightening of the clamp and a threaded shank section extending through said apertures, a nut threaded onto an outer end of said shank for drawing said clamping sections together, said outer end portions of said clamping sections extending generally parallel to each other and diagonally disposed with respect to the remainder of said clamping sections for imparting a bend to a wire secured between said clamping sections, and a pair of flanges respectively integrally joined to opposite longitudinal edges of said first clamping section and extending toward and overlapping said second clamping section for confining a wire between said clamping sections, said flanges diverging from each other in a direction extending away from outer end portions of said clamping sections.

References Cited in the file of this patent

UNITED STATES PATENTS

| | | |
|---|---|---|
| 1,230,394 | Ford | June 19, 1917 |
| 1,522,728 | Krohn | Jan. 13, 1925 |
| 2,061,291 | Robinson | Nov. 17, 1936 |

FOREIGN PATENTS

| | | |
|---|---|---|
| 910,041 | France | May 24, 1946 |
| 1,010,871 | France | June 16, 1952 |
| 444,666 | Italy | Jan. 26, 1949 |